United States Patent
Boland et al.

(10) Patent No.: US 7,729,561 B1
(45) Date of Patent: Jun. 1, 2010

(54) SEARCH IN TIME

(75) Inventors: John T. Boland, Fairport, NY (US);
Mark D. LeFebvre, Fairport, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1155 days.

(21) Appl. No.: 11/092,452

(22) Filed: Mar. 29, 2005

Related U.S. Application Data

(60) Provisional application No. 60/557,558, filed on Mar. 30, 2004.

(51) Int. Cl.
G06K 9/32 (2006.01)
G06K 9/00 (2006.01)

(52) U.S. Cl. ........................ 382/294; 382/109

(58) Field of Classification Search .............. 382/294, 382/284, 109
See application file for complete search history.

(56) References Cited

U.S. PATENT DOCUMENTS

| | | | |
|---|---|---|---|
| 5,649,032 A * | 7/1997 | Burt et al. ................ | 382/284 |
| 6,163,620 A | 12/2000 | Hojnacki et al. | |
| 6,243,483 B1 * | 6/2001 | Petrou et al. ................ | 382/103 |
| 7,058,197 B1 * | 6/2006 | McGuire et al. ............ | 382/100 |
| 2002/0122564 A1 * | 9/2002 | Rhoads et al. .............. | 382/100 |
| 2005/0165788 A1 * | 7/2005 | Yang et al. .................... | 707/10 |

OTHER PUBLICATIONS

"A Change Detection Method for Remotely Sensed Multispectral and Multitemporal Images Using 3-D Segmentation", Yamarnoto, et al, IEEE Transactions on Geoscience OTE Sensing, vol. 39, No. 5, May 2001, pp. 976-985.*

* cited by examiner

Primary Examiner—Wenpeng Chen
(74) Attorney, Agent, or Firm—RatnerPrestia

(57) ABSTRACT

A method for examining images on a computer display comprising the steps of: a) defining a geographic area of interest for a plurality of images; b) selecting a set of images from the plurality of images within the geographic area of interest for display; c) ordering the set of images according to their acquisition date and/or acquisition time; d) examining the set of images across a spatial domain; and e) examining the set of images across one or more time domains.

5 Claims, 4 Drawing Sheets

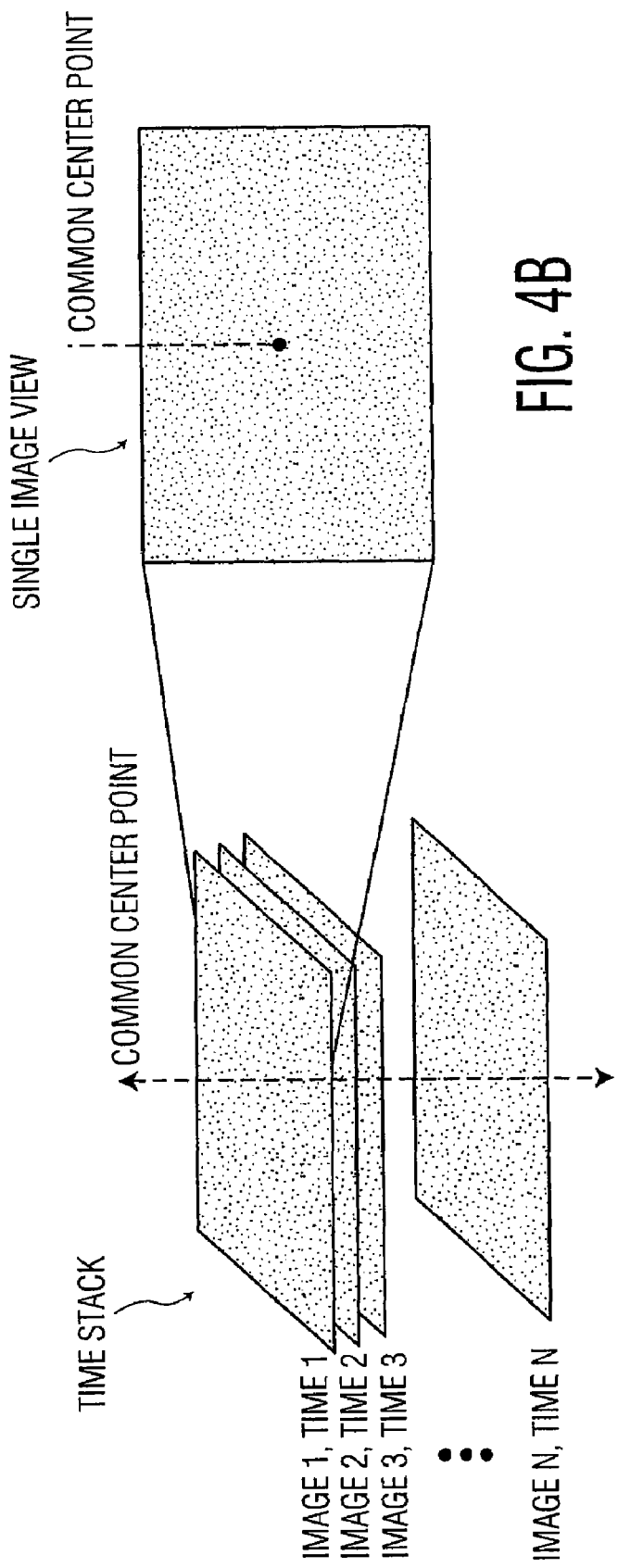

SEARCH IN TIME

CROSS REFERENCE TO RELATED APPLICATION

This application claims priority of U.S. Provisional Application No. 60/557,558, which was filed Mar. 30, 2004.

BACKGROUND OF THE INVENTION

Commercial satellite imagery is steadily becoming more accessible in terms of ground coverage, distribution, and cost. A key aspect the latest commercial satellite imagery is the large area, high-resolution coverage contained in a single image acquisition. This broad area of coverage, when combined with previously unobtainable resolution, allows the imagery to be used for analysis in new and powerful ways, including: emergency response, urban planning, and damage assessment. Such imagery can also be used in more traditional methods such as environmental assessment, but at a much finer level of detail than previously achievable. As computer processing and display capabilities improve, these satellite images can be quickly geo-registered or orthorectified, and then mosaicked into even larger areas of coverage.

A similar situation exists for airborne imagery that is captured on film and then digitized, or imagery that is directly captured in digital form using new large format digital cameras. In both cases the imagery is usually rectified and mosaicked to provide larger areas of coverage.

Imagery mosaics provide large area coverage by combining several adjacent, partially overlapping images in a continuous, and often seamless, presentation. As the images may have been taken at different times, the tone of the individual images is adjusted and then balanced across the mosaic. If the output of this process is written to a single image file, the result is referred to as a true mosaic.

An alternative concept, possible only in softcopy application, is to form an image mosaic for presentation, but never to form the single aggregate image, either in memory or written to a file. This process is referred to as forming a "virtual" mosaic. When viewing a virtual mosaic, the image processing system computes the extent of the image view based on the geographic location and magnification factor selected by the user. Only those pixels required to fill the image view are processed. In the interest of processing efficiency, virtual mosaics are typically not seamless. Image overlap is retained and in overlap areas one of the images is viewed as the default (i.e., on top of the stack). The user may choose a different image to be viewed on top, or the images can be blended in the overlap area.

The advantage of the virtual mosaic approach is that while the mosaic may include tens or hundreds of images (involving hundreds of megabytes of data), the system only has to address and process those pixels required to fill the selected view. On most image processing systems this is limited to a few megabytes of data. The virtual mosaic approach greatly reduces the processing and memory demands on the image processing system. It also reduces storage requirements in that the full mosaic file is never formed (which, in general, is close in size to the sum of all the component images), yielding an approximately fifty percent savings in storage.

Another advantage of the virtual mosaic concept is improved performance when "roaming" the image view across the coverage area. Roaming is typically used in image review and in area search operations, e.g., looking for specific objects in mosaic area. While many image processing systems have been optimized to roam well across a single image, they do not perform well when presented with a traditional mosaic. The file is simply too large and overwhelms the system memory and processor capabilities. The virtual mosaic approach alleviates these issues by only accessing the data required to fill the instantaneous view.

A necessary step to forming either a traditional or virtual mosaic is to perform some level of geo-registration on the images involved. This process places the images in their proper geographic position with respect to some projection space, enabling the mosaic process, and allows them to be presented in a desired orientation on the viewing screen, typically north-is-up. Geo-registration may be as simple as using geographic coordinates of 2 or more image corners to place the images in the projection space. Images are often provided with metadata that may include polynomial coefficients that allow the imagery to be warped into the desired projection space. A level of accuracy above this would be to place each image pixel using an explicit sensor projective model accounting for the particular acquisition geometry and assuming a flat terrain surface. The highest level of accuracy is achieved via a process called orthorectification. This process uses a projective model to place each pixel while correcting for all known sources of geometric error including terrain variation. The correction for terrain variation is accomplished by projecting each pixel to a model of the terrain surface. The terrain model is typically a matrix of regularly spaced elevation points (or posts). Some form of interpolation is used to determine the proper terrain elevation value when the pixel falls between the posts. Terrain models are produced at various sampling densities, e.g. 100 m spacing or 10 m spacing between posts. A terrain model that does not include man made objects or tall vegetation is referred to as a "bare-earth" model. More accurate, and more expensive, models include elevation information for buildings, bridges, overpasses, etc.

In the interests of cost and computation efficiency, traditional mosaics are usually made with imagery that has been orthorectified to a bare-earth terrain model. This results in errors in areas of varying elevation and in urban areas. The image seams must usually be placed in areas of locally flat terrain. The virtual mosaic process, which does not remove seams, typically uses a polynomial approach to place the images in the desired projection space.

An important issue when searching or roaming through an image mosaic is to maintain geographic context for the user. The geo-registration process described above allows the images to be presented in a consistent projection space, regardless of the specific acquisition conditions for each image. The geo-registration process takes out image differences such as scale and look azimuth.

The task of maintaining geographic context is further supported by simultaneous use of maps and other cartographic data. Raster maps, vector data, cadastral data, and point data are all used to assist the user in understanding the imaged scene. Raster maps are typically standard map sheets that have been scanned and digitized, as an image would be, resulting in a raster file format. Vector maps are used to represent data that is primarily linear in form such as roads, rail lines, and power lines. Vector data stores the vertices of the linear segments and in some cases associated attribute data, rather than a raster "image" of the feature, and therefore requires much less data storage to represent a typical feature. Cadastral data refers to ownership maps and can be in either raster or vector format. Point information such as cell tower location is stored in vector form.

Map data may be presented in the same display window as the imagery, in a separate display window, or on a completely separate display. In the first case, the map data may be used as a background layer for the imagery, blended in with the imagery, or presented in a flicker mode with the imagery. When presented in a separate window or display, it is common to have some form of real time linkage between the map and imagery windows, so that as the user moves in one window, the equivalent position is automatically indicated in the other. In each of these cases, the objective is to provide the user with an easily understood geographic reference that can assist the interpretation task.

The imagery interpretation task can be performed entirely by the user through visual inspection and analysis, or with some level of automation provided by the image processing system. One such process is change detection. Change detection refers to the process of comparing imagery over an area of interest taken at two different times. Images are compared either manually or automatically to determine those places where some change in the scene content has occurred. Imagery based change detection can be performed on a variety of image types including panchromatic, color, IR (infrared) and multi-spectral. Change detection can be performed at a number of "levels".

The simplest form is performed by a human analyst by comparing the before and after images, usually in some form of alternating presentation between the two images. The alternating presentation may be "flicker" mode wherein each image is presented alternatively for a few seconds (or some portion of a second) each. Other methods include: fading the images from a full presentation of the first to a full presentation of the second—this is sometimes referred to as a blend; swipe or wiping, wherein one image is incrementally replaced by the other in a wiping motion across the image format (the motion can be horizontal or vertical).

The most common automated method is gray-scale based change detection wherein the pixel values of the registered before and after images are compared at each location using a simple subtraction method. In U.S. Pat. No. 6,163,620, an improvement over this simple subtraction method is discussed wherein a search is performed for the best "match" at each location before the subtraction is performed. The result is a method that is notably resistant to registration errors between the two images. Preparatory techniques such as histogram equalization can help improve the result of any gray-scale based approach. Overall, this level of change detection provides results indicating that some form of change has likely occurred in a particular spot.

A "higher" level of change detection is based on image features. In this context features may be: entities that can be computed from the image pixels such as edges and textures (no understanding of the edge or texture implied); presumed man made objects such as roads, edges of fields, etc.; multi-spectral features such as computed band ratios [e.g. (band1−band2)/(band3)] where the feature may or may not have physical meaning. Overall, this level of change detection provides a result indicating that some form of man made change has likely occurred in a particular spot, or perhaps that the ground cover in a particular spot has changed from one material to another.

An even "higher" level of change detection is performed using 3-dimensional analysis of the imaged scene to determine change. This approach assumes that a 3-dimensional model of the scene, particularly of man-made objects such as buildings, exists prior to analysis. This model is compared to 3-dimensional data extracted from a recent image, or images in the case of stereo acquisitions. This level of change detection can provide a result indicating for example that a certain building has changed in size.

Example applications of change detection include: environmental assessment, ascertaining crop health, determining the presence of certain species of flora or fauna, monitoring encroachment of human activities on utility right-of-ways, pollution detection (water turbidity, dumping activities).

A frequent goal of such investigations is to determine not only where a problem exists, but also when the problem first became apparent. In this case the analyst is attempting to build a historical record of the "event", and the challenge is to conduct the search while maintaining context spatially— "Where is this?"—and temporally—"When is this?'

SUMMARY OF THE INVENTION

Searching in time is a unique and powerful method of the present invention for softcopy search efforts. The present invention automatically queues images containing an area of interest in a time-sequential order. Throughout the search session, an analyst may quickly move through time-sequenced images from the same or different sensors, allowing roaming both in space and in time, effectively providing a temporal mosaic.

The analyst may use a control such as a scroll-wheel, to blend smoothly or move incrementally, to the next or previous image in the sequence. This search in time method of the invention is a unique and powerful approach for determining when changes have occurred to existing, known locations, as well as for determining negation, allowing the user to determine the first time an object is not present or missing.

The present invention, briefly summarized, according to one aspect of the present invention, allows for examining images according to temporal and spatial criteria. The present invention includes the steps of:
 a) defining an area of interest for a plurality of images and image types;
 b) gathering pre-selected images within the area of interest for continuous viewing;
 c) positioning the images in a geo-referenced space;
 d) ordering the plurality of images according to their acquisition date and/or time;
 e) examining the plurality of images across a spatial domain; and
 f) examining the plurality of images across one or more time domains.

ADVANTAGEOUS EFFECT OF THE INVENTION

The present invention includes the following advantages:
Commonly used image viewers and change detection software packages allow the user to examine (or search) through one image at a time. If the user wants to examine spatially adjacent images, the user must determine which is the next appropriate image and command the system to display it. A similar situation exists for examining images based on their acquisition dates. In typical systems, the user must command the system to bring each image up in the desired time order. The present invention, on the other hand, allows the user to search through large numbers of images while automatically maintaining context both spatially and temporally, thus allowing the user to roam in the spatial and temporal domains without breaking concentration to find the next image.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 4 is a concept diagram of a multi-image flicker function, according to an embodiment of the present invention.

To facilitate understanding, identical reference numerals have been used, where possible, to designate identical elements that are common to the figures.

DETAILED DESCRIPTION OF THE INVENTION

Figure 1:
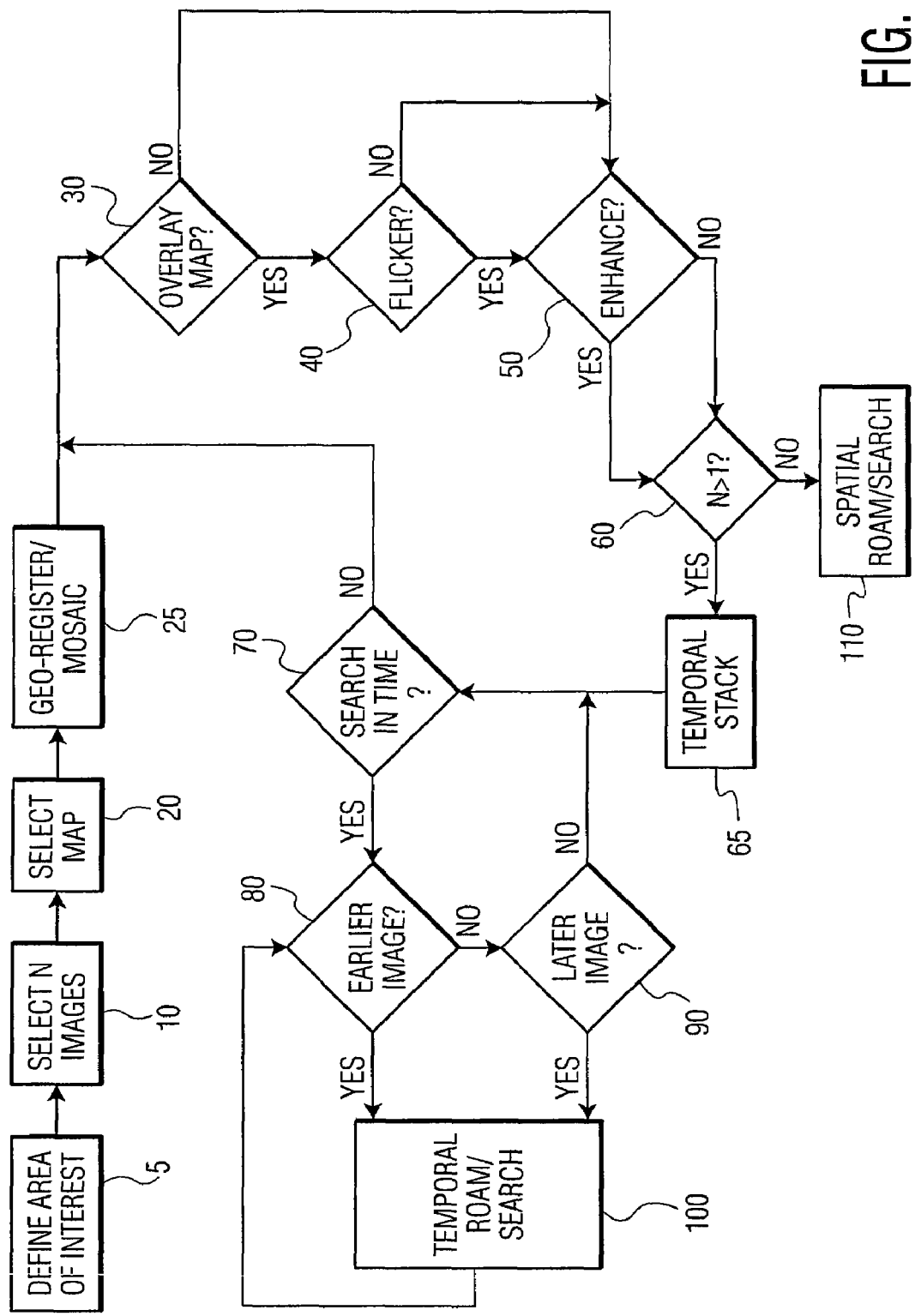
FIG. 1 is a flow diagram depicting steps of the search in time process, according to an embodiment of the present invention.

Referring first to FIG. 1, there is shown an embodiment of the invention. After selecting a geographic area of interest in step 5, the user selects one or more images to be exploited. The user has the option to select an image based on imagery attributes, such as sensor type, acquisition parameters, and content (e.g., cloud or snow cover percentage) in select image step 10. The user optionally may also select a map of the geographic area in step 20. The method of the invention next enters geo-registration/mosaic step 25, where the images are geo-referenced, and metadata is computed to facilitate formation of a virtual mosaic (although real mosaics may be used, with some reduction in flexibility).

Figure 2:
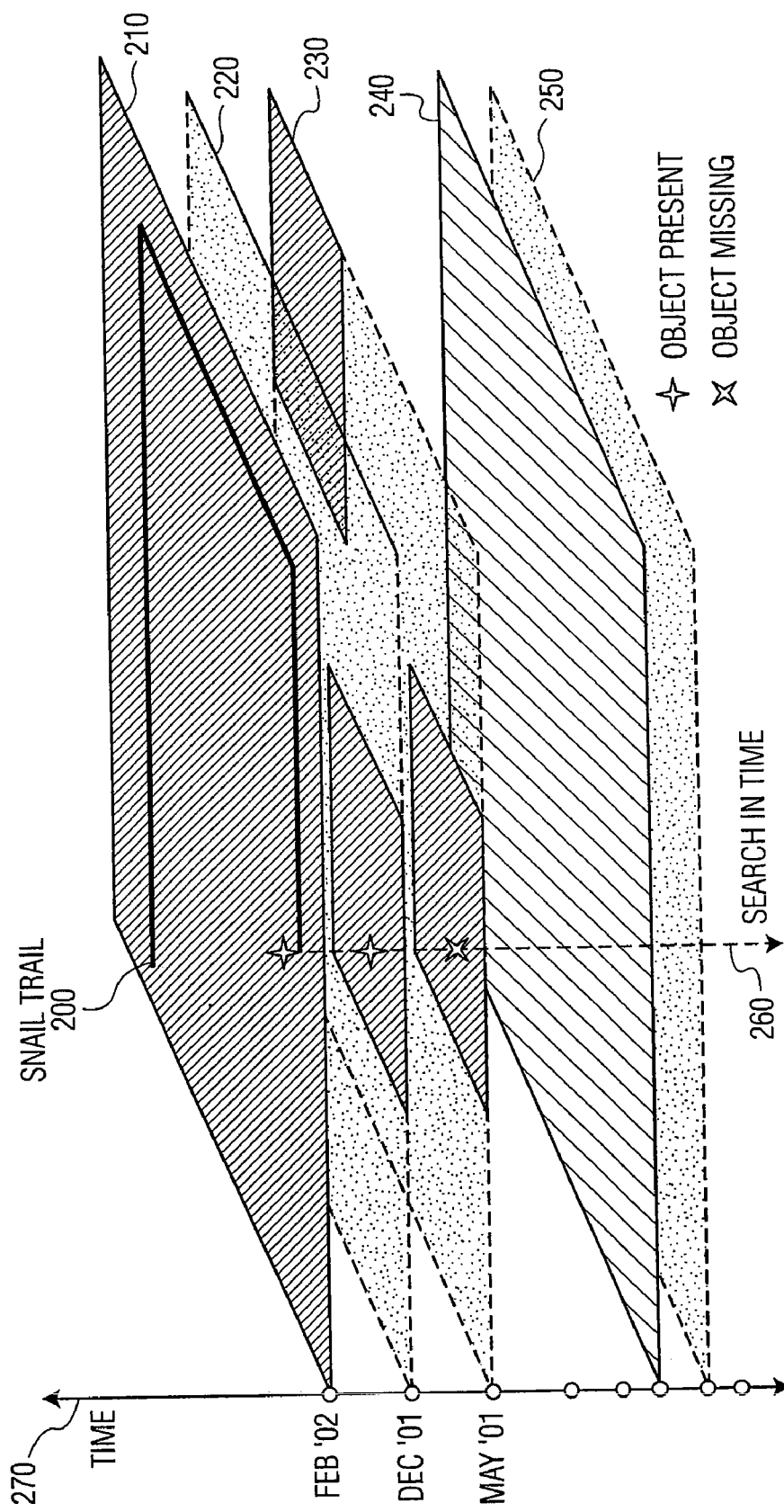
FIG. 2 is a conceptual representation of an exploitation session using an embodiment of the present invention.

The user has an option to overlay the image(s) on a map in decision box 30 and then flicker between the map layer and any of the imagery layers in decision box 40. Flicker may be implemented by one or more of the methods described in the background. The maps may include one or more layers 240 and 250 as shown in FIG. 2. These maps may be based on type, scale, date, etc., and thus may be a direct part of the present invention.

The user has a further option to apply image enhancements in decision box 50 that may include processes such as dynamic range adjustment, sharpening, and tonal adjustment. Other enhancements may be applied without departing from the scope of the present invention.

The user may next choose to roam or search in a current time layer by way of step 110, after decision box 60 determines that only one image (N=1) is selected. The roam step may include any number of the following: user selected direction (e.g., direction indicated via mouse or other mechanism); automatic horizontal or vertical roam, such as snail trail 200 and end of snail trail 260, as shown in FIG. 2, in which the area covered is graphically indicated on the displayed imagery, or an overview window, or other type of window.

If more than one image is selected, as determined in decision box 60, the images are automatically "stacked" by date in step 65 for eventual display. Date ordering may be by the exact date and time of day. For example, two images from the same day, but of different hours are stacked at different times, as shown schematically along time line 270 in FIG. 2. The user may also select a time interval during which all images would be considered to have been taken at the same time (e.g, images from 2003 vs. images from 2001, or images from March 2003 vs June 2003) and, thus may be logically placed in the same temporal layer.

The user may select to search in time or search temporally, by way of decision box 70, in which case a device such as a mouse scroll wheel may be used to control in which time layer roaming is occurring. An earlier image may be reached by decision box 80, while a later image may be reached by decision box 90.

Transition between time layers 210, 220 and 230, as shown in FIG. 2, may be incremental (jump from one layer to the next), or blend/fade (smoothly transition from one layer to the next). In one embodiment, the direction of temporal movement may be controlled via movement of the mouse wheel (e.g., forward for later in time, backward for earlier).

The user may then move spatially within a single time layer and also return to a previously viewed layer at a different spatial location in step 100. It will be appreciated that an auto return function for both spatial and temporal movements may be implemented that automatically returns to a previous state (location, or time, or both).

It is recognized that not every image needs to be present in a time layer for that layer to be searched. For example, layer 220 in FIG. 2 includes missing images. The method of the invention accommodates the missing imagery by skipping over it spatially, or by roaming through the void (perhaps represented by a color background) without interruption. A similar accommodation applies to temporal roaming, where a missing image in a time stack may be similarly skipped or roamed through.

It is also noted that the method of the invention may be used to roam in time automatically, where images may be presented in temporal order automatically using the incremental or fading techniques referred to previously. The system may also be used to automatically spatially roam through one time layer and then proceed to the next time layer and spatially roam through that time layer, and also subsequent time layers. In both temporal and spatial roaming, the automatic process may be interrupted to allow for user directed roaming, and the method may then return to the interruption point, or proceed automatically from the release point (the point at which the intervention is completed).

Figure 3:
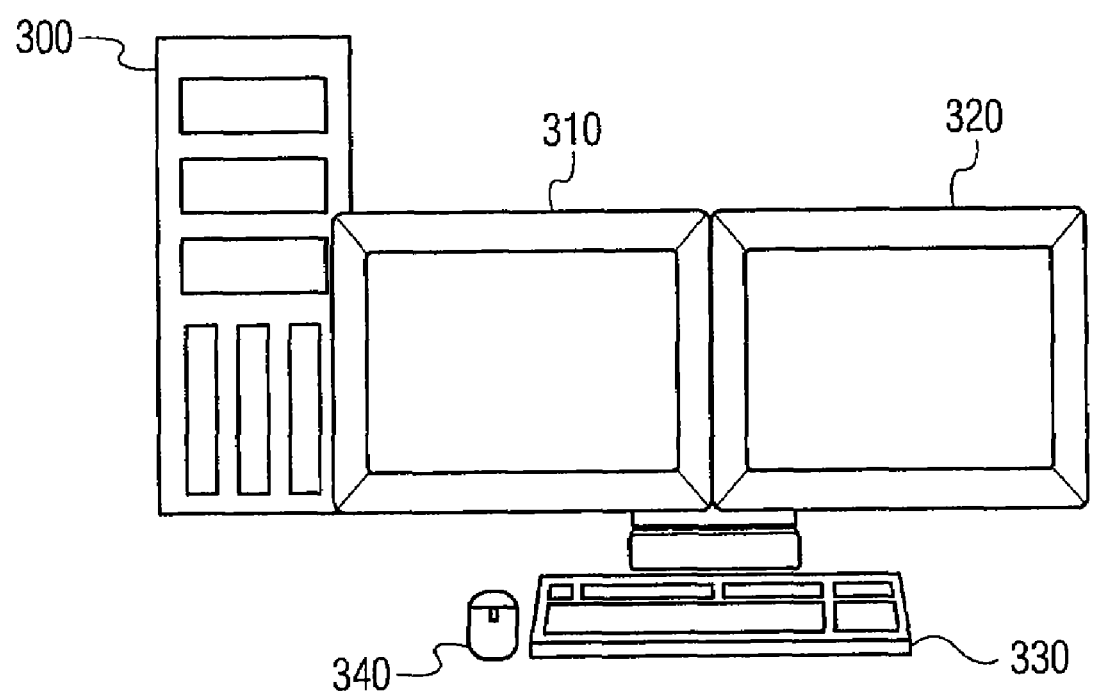
FIG. 3 depicts a computer system including processor, displays and controls to implement an embodiment of the present invention.

Referring next to FIG. 3, there is shown an exemplary system, in which the method of the invention, as exemplified in FIG. 1, may be implemented. As shown, the system includes processor 300, overview display 310, roaming display 320, keyboard 330 and scroll mouse 340.

For a set of associated images, multi-image operations are supported by the present invention. Where possible, these operations may support the entire set of associated images. This is particularly the case with the multi-image flicker function. In such case, the method may display in the same window each image in the association in succession (up to 15, for example) using the same orientation, at some configurable time interval. This is shown conceptually in FIG. 4. As shown, N-images are stacked temporally in successive time periods. Each of the N-images have the same orientation and a common center point. A user may only see one image at any particular time. When the user roams, pans, or rotates through one image, the remaining images in the stack are also roaming, panning, or rotating about the common center point. In this manner, the user is able to "flip through" the entire stack.

Analysts should be able to select the set of images to include in these multi-image operations. If possible, they should also be able to select the order in which the images are displayed, including an automated option to order the images by time of collection.

The invention has been described with reference to an exemplary embodiment; however, it will be appreciated that variations and modifications may be affected by a person of ordinary skill in the art without departing from the scope of the present invention.

PARTS LIST

5 Define Area of Interest Stage (or step)
10 Select Image Stage (or step)
20 Select Map Stage (or step)
25 Geo-registration/Mosaic Stage (or step)
30 Overlay Map Decision Box
40 Flicker Decision Box
50 Enhancement Decision Box
60 Multiple Image Decision Box
65 Temporal Stacking Stage (or step)
70 Search In Time Decision Box
80 Select Earlier Image Decision Box
90 Select Later Image Decision Box
100 Temporal Examination Stage (or step)
110 Spatial Examination Stage (or step)
200 Start of Snail Trail
210 Latest Images
220 Earlier Images
230 Earliest Images
240 Map Type A
250 Map Type B
260 End of Snail Trail
270 Time Scale
300 Processor
310 Overview Display
320 Roaming Display
330 Keyboard
340 Scroll Mouse

What is claimed:

1. A method of examining images on a computer display comprising the steps of:
  (a) defining, using a computer, a geographic area of interest for a plurality of images;
  (b) selecting, using the computer, a set of images from the plurality of images within the geographic area of interest for display;
  (c) sequentially ordering in a time domain, using the computer, the set of images according to their acquisition date and/or acquisition time; wherein (i) the images are sequentially stacked in the time domain to overlie one another in a vertical direction of time, and (ii) one image has a first geographic point aligned above or below another image having a second geographic point, and the first and second geographic points are the same in a spatial domain having a horizontal direction;
  (d) examining the set of images across the spatial domain in the horizontal direction;
  (e) examining the set of images across the time domain in the vertical direction of the stacked images;
  (f) flickering through more than two images that are sequentially stacked in the time domain, in the vertical direction of time until the user is able to flip through an entire stack of images,
  (g) detecting presence or absence of an object while flickering through the entire stack of images;
  (h) interrupting the flickering step (f), and selecting a first image in the set of images, and spatially roaming through the selected first image; and
  (i) continuing the flickering step (f) after completing step (h), and again interrupting the flickering step (f), and selecting a second image in the set of images, and spatially roaming through the selected second image;
  wherein the first or second image is examined during the interruption of the flickering step (f), and after completion of the examination of the first or second image, the flickering step continues from a point of the interruption.

2. The method of claim 1, wherein the step of sequentially ordering in the time domain the set of images is executed automatically by a processor.

3. The method of claim 1, wherein the step of examining the set of images across the time domain includes:
  examining images with different dates of acquisition by using a transition method, executed by the computer, for viewing differences among the sets of images.

4. The method claimed in claim 3, wherein the transition method is selected from the group consisting of: blending, stepping, wiping, checkerboarding, and dissolving.

5. A method for examining geo-referenced images on a computer display comprising the steps of:
  a) defining, using a computer, an area of interest for a plurality of images;
  b) selecting, using the computer, a set of images from the plurality of images within the area of interest for display;
  c) sequentially ordering in a time domain, using the computer, the set of images according to their acquisition date and/or acquisition time; wherein (i) the images are sequentially stacked in the time domain to overlie one another in a vertical direction of time, and (ii) one image has a first geographic point aligned above or below another image having a second geographic point, and the first and second geographic points are the same in a spatial domain having a horizontal direction;
  d) examining the set of images across the spatial domain in the horizontal direction;
  e) examining the set of images across the time domain in the vertical direction of the stacked images;
  f) blending to a previous date while flickering through more than two images that are sequentially stacked in the vertical direction;
  g) detecting presence or absence of an object, while flickering through the stack of images;
  (h) interrupting the flickering step (f), and selecting a first image in the set of images, and spatially roaming through the selected first image; and
  (i) continuing the flickering step (f) after completing step (h), and again interrupting the flickering step (f), and selecting a second image in the set of images, and spatially roaming through the selected second image;
  wherein the first or second image is examined during the interruption of the flickering step (f), and after completion of the examination of the first or second image, the flickering step continues from a point of the interruption.

* * * * *